United States Patent
Koscielski et al.

(10) Patent No.: US 9,895,775 B2
(45) Date of Patent: Feb. 20, 2018

(54) SYSTEM AND METHOD WITH DRAG CONVEYOR FOR HIGH RATE PRODUCTION WELDING

(71) Applicant: Doben Limited, Windsor (CA)

(72) Inventors: Larry Koscielski, Lasalle (CA); Gregory I. Heuchan, Windsor (CA); Eric Michaud, Amherstburg (CA); Matt Branoff, Lasalle (CA); Darcey D. Renaud, Lasalle (CA)

(73) Assignee: DOBEN LIMITED, Windsor (CA)

( * ) Notice: Subject to any disclaimer, the term of this patent is extended or adjusted under 35 U.S.C. 154(b) by 0 days.

(21) Appl. No.: 15/120,930

(22) PCT Filed: Jul. 2, 2015

(86) PCT No.: PCT/CA2015/050613
§ 371 (c)(1),
(2) Date: Aug. 23, 2016

(87) PCT Pub. No.: WO2016/000076
PCT Pub. Date: Jan. 7, 2016

(65) Prior Publication Data
US 2016/0368106 A1 Dec. 22, 2016

Related U.S. Application Data

(60) Provisional application No. 62/020,064, filed on Jul. 2, 2014.

(51) Int. Cl.
*B65G 47/24* (2006.01)
*B23K 37/04* (2006.01)
(Continued)

(52) U.S. Cl.
CPC ........ *B23K 37/0408* (2013.01); *B23K 11/115* (2013.01); *B23K 11/14* (2013.01);
(Continued)

(58) Field of Classification Search
CPC .... B65G 47/14; B65G 47/1471; B65G 47/22; B65G 47/24
(Continued)

(56) References Cited

U.S. PATENT DOCUMENTS 2,685,018 A 7/1954 Mynar, Jr.
2,843,166 A 7/1958 Van Alstyne
(Continued)

FOREIGN PATENT DOCUMENTS

CA 1071566 2/1980
CA 2420929 2/2003
(Continued)

OTHER PUBLICATIONS

International Preliminary Report on Patentability for PCT Application No. PCT/CA2015/050614 dated Jan. 12, 2017.
(Continued)

*Primary Examiner* — James R Bidwell
(74) *Attorney, Agent, or Firm* — Carlson, Gaskey & Olds, P.C.

(57) ABSTRACT

An assembly system, such as welding system, includes an assembly station that is configured to assemble a component to a part in a loaded position. A drag conveyor includes a movable conveyor member that supports multiple locating elements configured to cooperate with a locating feature on a part. A friction bar is arranged along the locating elements, and the locating elements extend beyond the friction bar. The friction bar is configured to support the part and reorient the part from an unoriented position to an oriented position while the movable conveyor member drags the part along the friction bar. A robot is configured to transfer a part from the oriented position on the conveyor to the loaded position at the assembly station, such as a welding unit.

22 Claims, 16 Drawing Sheets

(51) Int. Cl.
  *B23P 19/00* (2006.01)
  *B23P 19/04* (2006.01)
  *B23K 11/11* (2006.01)
  *B23K 37/047* (2006.01)
  *B23K 11/14* (2006.01)

(52) U.S. Cl.
  CPC ............ *B23K 37/047* (2013.01); *B23P 19/00* (2013.01); *B23P 19/04* (2013.01); *B65G 47/24* (2013.01)

(58) Field of Classification Search
  USPC .................................. 198/388, 397.06, 400
  See application file for complete search history.

(56) References Cited

U.S. PATENT DOCUMENTS

| | | | |
|---|---|---|---|
| 2,905,803 A | 9/1959 | Brady, Jr. | |
| 3,233,752 A | 2/1966 | Lagler et al. | |
| 3,415,350 A | 12/1968 | Murphy | |
| 4,215,262 A | 7/1980 | Brastow | |
| 4,341,502 A | 7/1982 | Makino | |
| 4,754,116 A | 6/1988 | Naruse et al. | |
| 4,789,768 A | 12/1988 | Tobita et al. | |
| 4,893,402 A | 1/1990 | Hirasaka et al. | |
| 4,929,146 A | 5/1990 | Koster et al. | |
| 5,513,428 A | 5/1996 | Shiramizu et al. | |
| 6,163,004 A | 12/2000 | Aoyama et al. | |
| 6,283,272 B1* | 9/2001 | Hsieh | B65G 47/1407 198/394 |
| 6,415,902 B1* | 7/2002 | Vis | A23N 15/045 198/384 |
| 6,481,560 B2* | 11/2002 | Kearney | B65G 47/1478 198/396 |
| 6,875,946 B2 | 4/2005 | Hidaka | |
| 7,975,828 B2* | 7/2011 | Tas | A23N 7/04 198/394 |
| 8,875,868 B2 | 11/2014 | Auf der Maur | |
| 2003/0107581 A1 | 1/2003 | Cabanaw | |
| 2010/0108466 A1* | 5/2010 | Herzog | B65G 47/256 198/400 |
| 2012/0318637 A1 | 12/2012 | Ito et al. | |
| 2014/0014469 A1* | 1/2014 | Fredrickson | B65G 47/24 198/401 |

FOREIGN PATENT DOCUMENTS

| | | |
|---|---|---|
| CA | 2418697 | 9/2003 |
| DE | 4339398 | 9/1994 |
| EP | 1762326 | 3/2007 |
| JP | 09024474 | 1/1997 |
| JP | 4186167 | 11/2008 |
| WO | 2007074561 | 7/2007 |
| WO | 2014030261 | 2/2014 |
| WO | 2012172516 | 4/2014 |

OTHER PUBLICATIONS

International Preliminary Report on Patentability for PCT/CA2015/050613 dated Oct. 5, 2016.
International Search Report and Written Opinion for PCT/CA/050614 dated Nov. 23, 2015.
International Search Report and Written Opinion for PCT/CA/050613 dated Sep. 22, 2015.

* cited by examiner

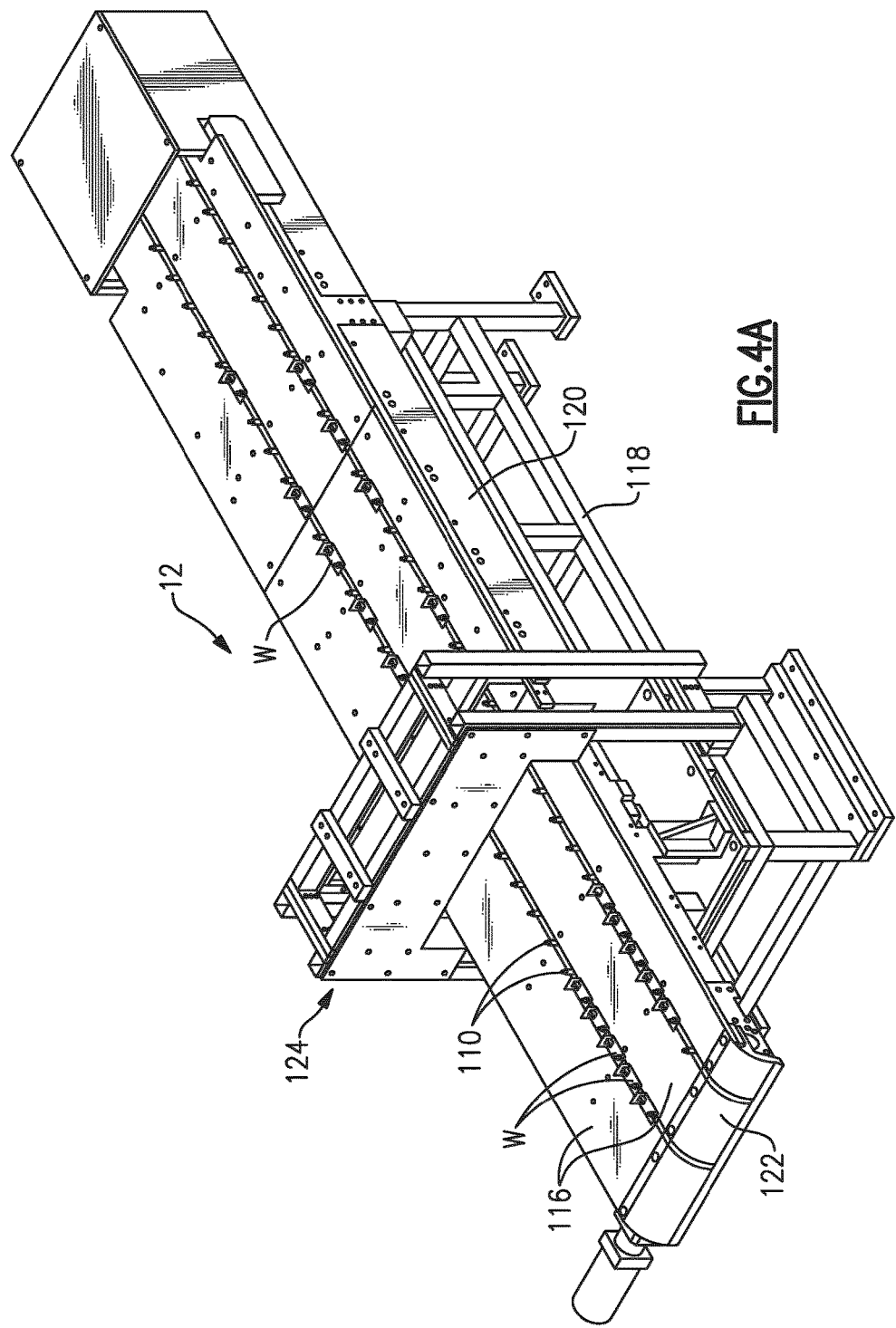

SYSTEM AND METHOD WITH DRAG CONVEYOR FOR HIGH RATE PRODUCTION WELDING

CROSS-REFERENCE TO RELATED APPLICATIONS

This application claims priority to U.S. Provisional Application No. 62/020,064, which was filed on Jul. 2, 2014 and is incorporated herein by reference.

BACKGROUND

This disclosure relates to drag conveyor that is used, for example, with a welding system and welder used to secure fasteners to stampings.

The production of complex assemblies such as vehicles, appliances, consumer goods, and furniture often requires the fabrication of welded subassemblies, such as sheet metal workpieces with one or more welded fasteners. In the production of an assembly as complex as a vehicle, there can be a considerable quantity and variety of such sheet metal workpieces that are produced in a stamping operation for later welding in batches to produce the required welded subassemblies. A machine operator must remove a randomly oriented and sometimes interlocked sheet metal workpiece from the storage bin before loading it into the welding machine. A second component is then added manually or by automation in preparation for welding. In the case of resistance welding, two electrodes close upon the workpiece and second component before applying force and a high current necessary for completing the resistance weld. The finished subassembly is then removed from the machine in preparation for repeating the welding operation.

As automotive component production costs continue to be pressured lower, labor productivity is under increased scrutiny. The common direction in the industry is to replace labor with significant automation. To be competitive, it is important to maximize the productivity of both the equipment and operator. Much effort is being directed to address this challenge by building equipment with elements such as one or more fixtures to orient the workpiece or complex vision systems that permit a robot to accurately grasp and position the workpiece. Such systems can be challenging to set-up and may require specialized and costly skills to configure, troubleshoot and maintain. The problem this approach has created is equipment that is too hard for many customers (or specific plants) to set-up, operate and maintain. Some cannot access skilled labor, or they do not have enough complex equipment to justify investment in skilled labor and tools. Excessive sophistication may limit the operational reliably in the production environment. The complexity also increases the capital cost of the equipment and the inventory of spare parts to keep it in operation.

It is desirable to use equipment that is simple to configure, operate, troubleshoot, and maintain. It is also desirable to minimize the equipment changeover time while also minimizing its complexity.

SUMMARY

In one exemplary embodiment, an assembly system includes an assembly station that is configured to assemble a component to a part in a loaded position. A drag conveyor includes a movable conveyor member that supports multiple locating elements that are configured to cooperate with a locating feature on a part. A friction bar is arranged along the locating elements. The locating elements extend beyond the friction bar. The friction bar is configured to support the part and reorient the part from an unoriented position to an oriented position. A robot is configured to transfer a part from the oriented position on the conveyor to the loaded position at the assembly station.

In a further embodiment of the above, the conveyor member is a continuous chain that supports the multiple locating elements.

In a further embodiment of any of the above, the conveyor includes multiple rows of conveyor members with locating elements.

In a further embodiment of any of the above, the locating elements are transfer pins.

In a further embodiment of any of the above, the conveyor includes a sprocket coupled to the chain. A support bar is arranged beneath the chain and adjacent to the sprocket. The support bar is configured to position the locating element as the locating element approaches an end of the conveyor.

In a further embodiment of any of the above, the conveyor has an adjustment assembly connected to the friction bar and is configured to move the friction bar relative to the locating elements.

In a further embodiment of any of the above, the adjustment assembly includes a linkage interconnecting a cylinder to a frame that supports the friction bar. The frame is configured to move vertically in response to the cylinder pivoting the linkage.

In a further embodiment of any of the above, the conveyor includes a guide arranged on the friction bar adjacent to the locating element. The guide is configured to reorient the part from the unoriented position to the oriented position.

In a further embodiment of any of the above, the guide has a ramp that is configured to cooperate with a front of the part to lift the front off of the friction bar.

In a further embodiment of any of the above, there are multiple conveyors. Each conveyor is configured to carry a different part.

In another exemplary embodiment, a method of positioning a part with a conveyor that includes the step of manually loading a part onto a conveyor locating element in an unoriented position. The part is dragged along a conveyor friction bar to an oriented position. The part is picked up robotically from the oriented position.

In a further embodiment of any of the above, the multiple locating elements are arranged at a regular spacing. The manually loading step includes manually loading parts onto the locating elements at an irregular spacing.

In a further embodiment of any of the above, the locating element is a transfer pin. The manually loading step includes placing the transfer pin through a hole in the part.

In a further embodiment of any of the above, the dragging step includes pivoting the part about the transfer pin from the unoriented position to the oriented position.

In a further embodiment of any of the above, the manually loading step includes manually loading parts onto multiple rows of conveyor locating elements.

In a further embodiment of any of the above, the manually loading step includes supporting the part on the conveyor friction bar and comprising the step of adjusting a height of the friction bar relative to the conveyor locating element prior to the manually loading step.

In a further embodiment of any of the above, the dragging step includes stabilizing the locating element near an end of the conveyor prior to performing the part picking up step.

In a further embodiment of any of the above, the method includes the step of laterally adjusting a position of the part from a first oriented position to a second oriented position near an end of the conveyor prior to performing the part picking up step.

In another exemplary embodiment, an assembly system conveyor includes a continuous conveyor member that each include multiple transfer pins that are configured to cooperate with a hole in a part. Friction bars are arranged along lateral sides of a row of the transfer pins. The transfer pins extend beyond the friction bars. The friction bars are configured to support the part and reorient the part from an unoriented position to an oriented position.

In a further embodiment of any of the above, a support bar is arranged beneath the continuous conveyor member. The support bar is configured to position the transfer pin as the transfer pin approaches an end of the conveyor.

In a further embodiment of any of the above, an adjustment assembly is connected to the friction bar and is configured to move the friction bar vertically relative to the transfer pin.

In a further embodiment of any of the above, the conveyor includes a guide arranged on the friction bar adjacent to the locating element. The guide is configured to reorient the part from the unoriented position to the oriented position.

BRIEF DESCRIPTION OF THE DRAWINGS

The disclosure can be further understood by reference to the following detailed description when considered in connection with the accompanying drawings wherein:

FIG. 4A is a perspective view of another part conveyor;

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The disclosed system provides low-cost automation to weld fasteners, or secure other parts such as pins, clips, or brackets to sheet metal stampings at high speeds. The same system can be applied to other assembly processes such as rivets, self-piercing fasteners, mechanical fasteners to a variety of workpieces including those made of plastic. Thus, although the disclosed system is discussed primarily in terms of a welding system and method, it should be understood that other types of securing systems are contemplated.

Figure 1:
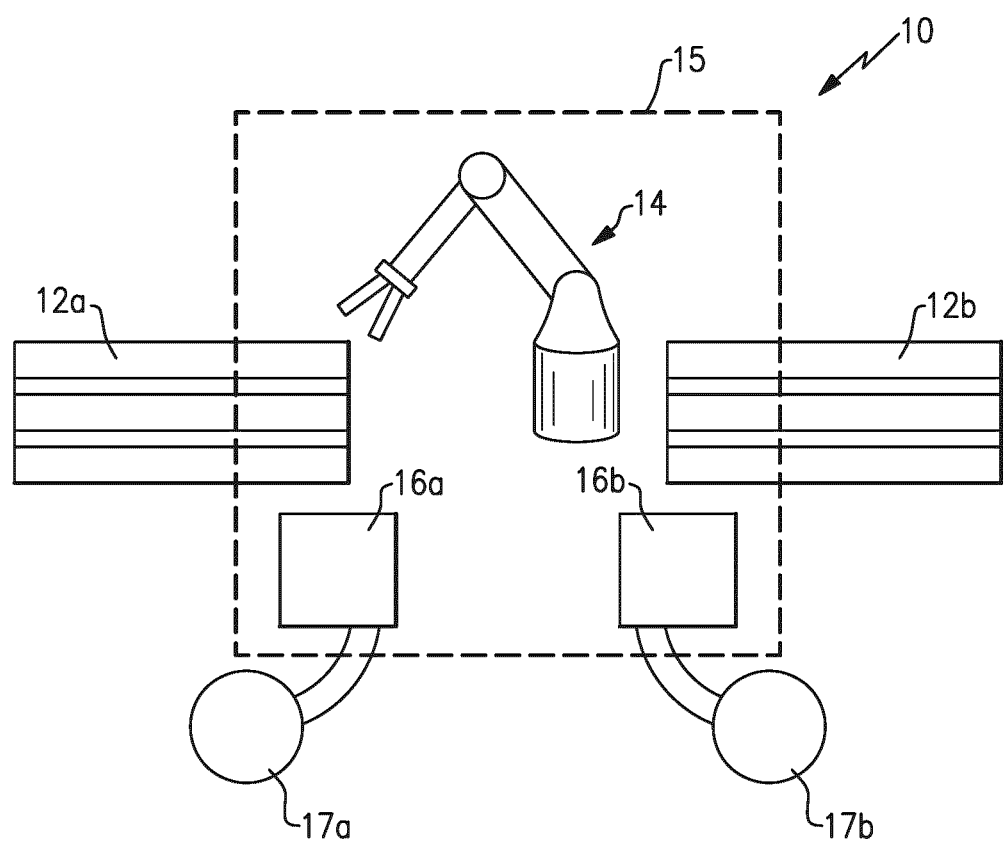
FIG. 1 is a highly schematic view of a welding cell embodiment.

A welding system 10 is schematically illustrated in FIG. 1. First and second conveyors 12a, 12b feed different parts, such as stampings, into a robot 14 within a welding station 15. The robot 14 transfers the parts from the conveyors 12a, 12b to welding machines 16a, 16b. One welding machine 16a secures studs supplied by a vibratory feeder bowl 17a, and the other welding machine 16b secures nuts supplied by a vibratory feeder bowl 17b. The arrangement shown in FIG. 1 is exemplary only and may be configured differently than illustrated.

Figure 2:
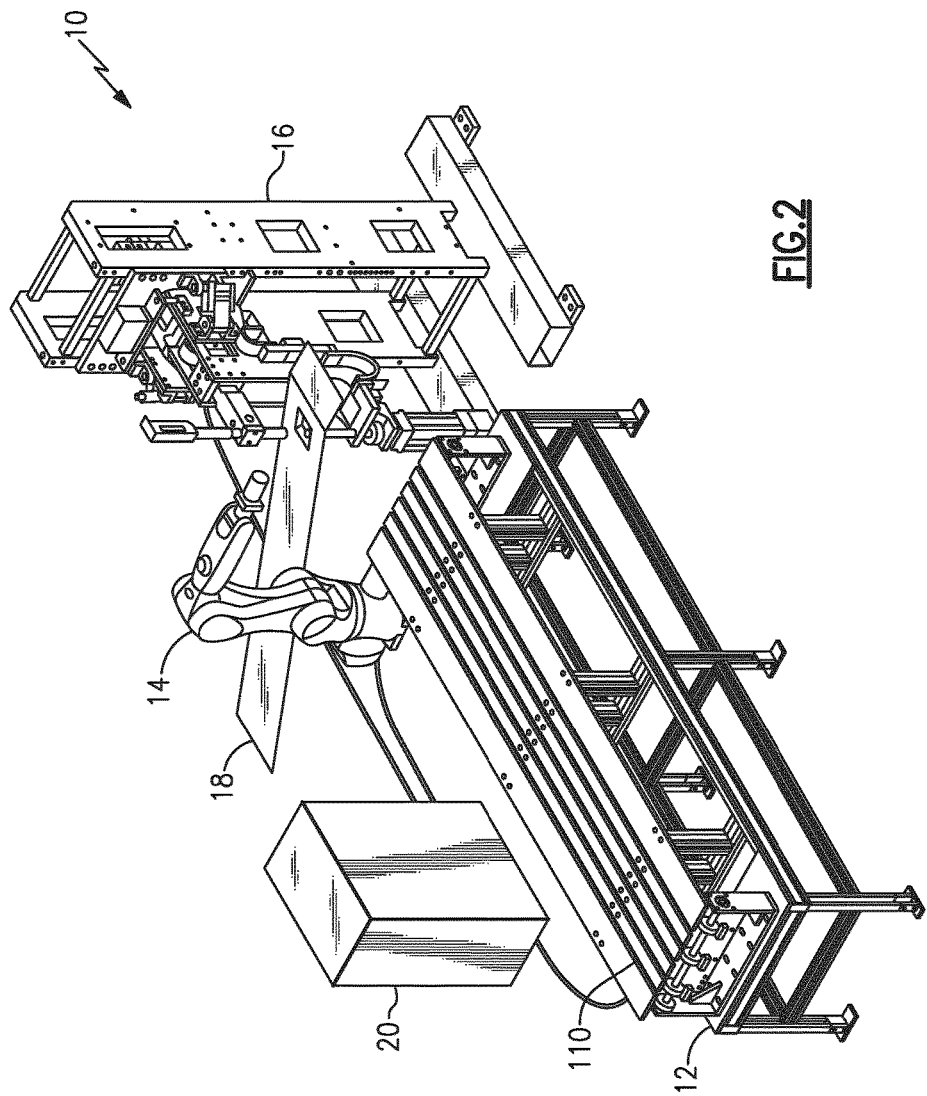
FIG. 2 is a simplified perspective view of a welding system embodiment without guarding or material handling.

FIG. 2 shows one example welding system 10 for high-rate production in more detail that includes a drag conveyor 12, high-speed robot 14, welding machine 16, unload chute 18, and control system 20. The drag conveyor 12 provides a number of equally spaced load stations, each having a transfer pins 110 for engaging a workpiece to which a component such as a fastener will be welded. The drag conveyor 12 advances workpieces loaded by an operator onto transfer pins 110 at one end towards an unload end (shown in more detail in FIG. 3). The high-speed robot 14 is positioned in close proximity to the unload end of the drag conveyor 12 where it will grasp a workpiece and the welding machine 16 to which it will present the workpiece for welding. A control system 20 is interconnected to each of the elements of the welding system 10 to provide functional control and coordination of the motions of the elements to minimize the operating cycle time. In one example, the welding system 10 may be configured to weld than thirty or more different assemblies. The control system 20 maintains data for each assembly needed to manage the position and number of fasteners in each assembly, instructions for when the robot can release the assembly, error recovery protocols, weld signatures, and other information for automating the welding of the assembly.

Figure 3:
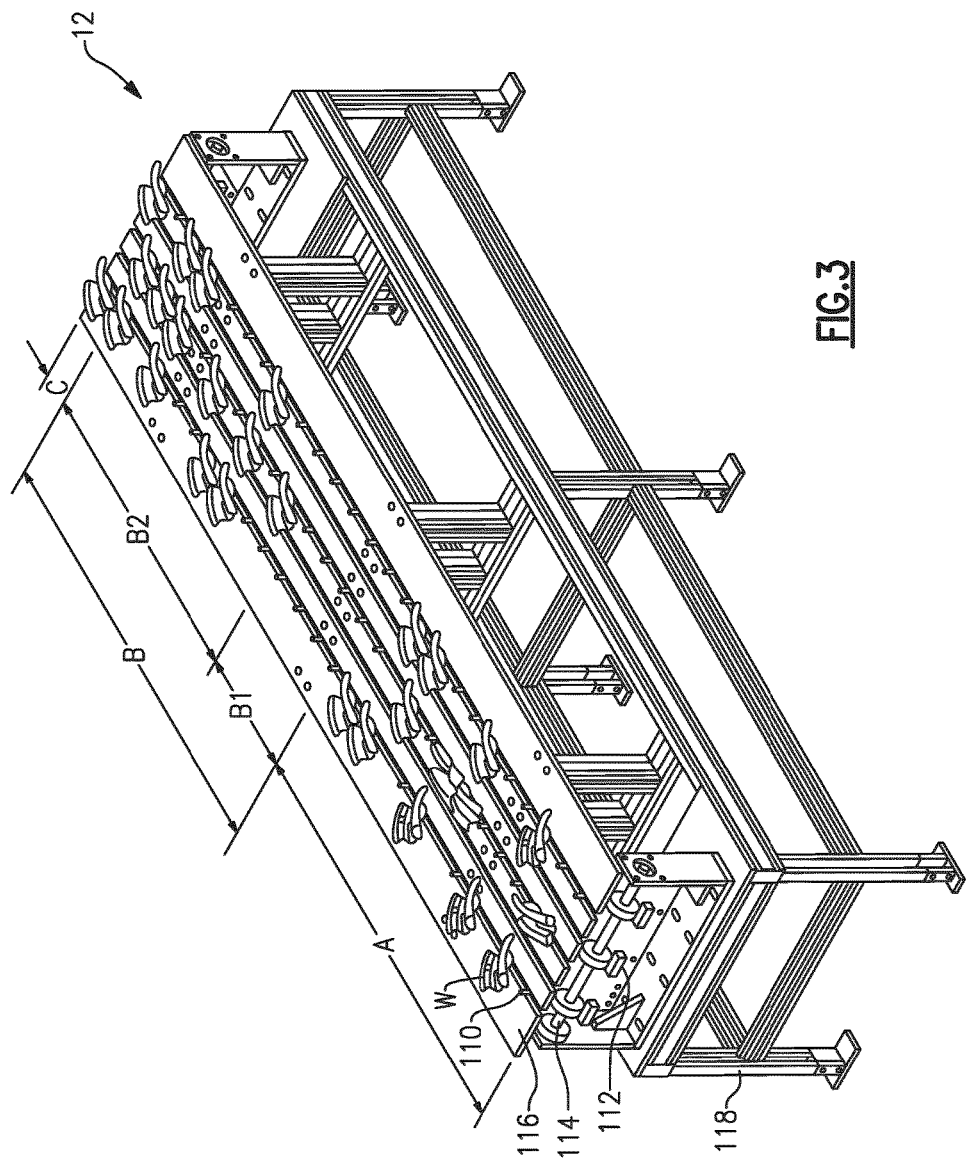
FIG. 3 is a perspective view of a part conveyor with random workpiece placement with a fixed table.

FIG. 3 is a perspective view of the drag conveyor 12 with the addition of a number of workpieces W. The workpieces W are engaged on number of evenly spaced transfer pins 110 are affixed to conveyor chains 112. Three such conveyor chains 112 are supported and driven by a sprocket assembly at each end of the drag conveyor 12, which has a fixed table in this example. The conveyor chains 112 are aligned with spaces provided between adjacent friction bars 116 to permit the travel of the transfer pins 110 and thereby the workpieces W.

The workpiece W shown in FIG. 3 is used to illustrate the principles of operation and is not representative of the range and size of permissible workpieces W. While not defined in the hardware, a number of zones are illustrated in FIG. 3 to explain the operation of the drag conveyor 12. An operator loading zone A, is within easy reach of an operator who will manually sort, orient, and place a workpiece W so the selected attribute of the workpiece W, such as a specific hole, engages a transfer pin 110. Within zone A, the orientation of the workpiece W is not required to be precise and the number of occupied transfer pins 110, as well as the sequence in which they are loaded is not important. The sprocket assembly 114 drives the conveyor chains 112 to advance the transfer pins 110 towards the unloading zone C. Along the length of the drag conveyor there is a workpiece orientation zone B in which the friction of the workpiece W acting against the friction bar 116 urges the workpiece W into a generally consistent orientation. Also illustrated is an empty zone B1 which corresponds to a time when the operator was unable to load a workpiece W. This could be for any number of reasons such as when convenient access to workpieces W is not possible. This could occur when there is an interruption of the supply of workpieces, such as might occur when the container holding them is empty and requires replacement. In the oriented part zone B2 the workpieces are progressively oriented such that when leaving this zone and entering the unloading zone C, they are in a position identifiable by the high-speed robot 14.

In the unloading zone C, a detection method would be employed so the control system 20 can communicate the workpiece W location to the high-speed robot 14. The detection method could be an inductive proximity switch, photo switch, laser, or imaging system. The detection method could detect and verify the workpiece W in the unloading zone C, or it could be incorporated into the high-speed robot 14 tooling that is used to capture the workpiece W for loading into the welding machine. The drag conveyor 12 would be advanced to position at least one workpiece W in the unloading zone C within reach of the robot. The high-speed robot 14 could wait until a workpiece W has reached a fixed unloading position, or it could capture the workpiece while it is moving within the unloading zone C if the drag conveyor 12 and high-speed robot 14 are operated in coordinated motion.

The detection method employed to detect and verify the workpiece W is within the unloading zone C can also be used to verify an attribute of the workpiece W so that a misaligned or incorrect workpiece W can be discharged from the drag conveyor 12 simply by moving it past the point at which the workpiece W remains engaged with the friction bars 116 and transfer pin 110.

The conveyor frame 118 shown in FIG. 3 is illustrative only. It can be a free-standing unit as shown or integrated with the frame supporting other components of the welding system 10. The number and length of conveyor chains 112 is dependent on the number and spacing of transfer pins 110 required to support the welding system 10 operating requirements. The transfer pins 110 may not have a circular cross section and may be of any length required to engage the workpiece W while it is resting on a surface. The length and definition of the illustrated drag conveyor 12 zones is a function of the welding system 10 operating requirements and other factors such as machine guarding, and the duration of friction application required to ensure the workpieces W are consistently oriented. The friction bar 116 would commonly be made of sheet or plate steel with a width, length, and thickness suited to the size of the workpiece W. Instead of changing the length of transfer pins 110 to suit different workpieces W, provision can be made to change the spacing between the friction bar 116 and conveyor chain 112.

The drag conveyor 12 shown in FIG. 3 is an example configuration. The transfer path does not need to be linear as illustrated. The transfer path could be circular as a rotary table, a serpentine shape, or have transitions to different shapes along the length of travel. The transfer path also does not need to be in one plane or in a plane parallel to the floor. The conveyor chain 112 can be driven by any number of means such as the high-speed robot 14 controller to provide for coordinated motion, a speed-controlled motor, or a ratcheting drive connected to a pneumatic cylinder. The friction bars 116 can be made of any number of metal, other material such as self-healing polymer, or a combination of materials. The friction bars 116 may also be supplemented with risers or guides if, for example, they are beneficial to speed up workpiece W orientation, reduce the chance the workpiece W will lock on the transfer pin 110, or prevent motion that would cause interference between adjacent workpieces W. The space between friction bars could be occupied with conveyor chain 112 link, accessory, or cover that prevents the workpiece W from engaging with the gap between adjacent friction bars 116 if the such engagement would prevent the workpiece W from moving to the desired alignment.

The welding system 10 is configured to accept a workpiece W such as a sheet metal stamping and weld a component part to it, such as a fastener F (e.g., FIGS. 9A-9D), in the shortest time possible. The individual stations of a drag conveyor 12 include a transfer pin 110 which engages in a hole in the workpiece to pull the workpiece W from the loading point to an unloading point. The geometry and mass of the workpiece W will determine its attitude when resting on the drag conveyor 12 and engaged with the transfer pin 110. Friction between the bed of the drag conveyor 12 and the workpiece W is sufficient to urge all of the workpieces into a sufficiently consistent orientation as they are moved towards the unload position.

The number and spacing of the transfer pins 110 will determine the length and width of the drag conveyor 12. The diameter of the transfer pins 110 is selected to engage the hole in the range of workpieces to be welded, have sufficient strength to minimize bending, and to provide some clearance between the hole and workpiece W so the high-speed robot 14 can reliably remove the workpiece W. The length of the transfer pin 110 is based on the height above the drag conveyor 12 where the workpiece engages the transfer pin 110. The height of the drag conveyor 12 depends on whether it is to be manually loaded at a convenient height for an operator, or by automation directly from the stamping equipment used in production of the workpiece.

The drag conveyor 12 has three rows of twenty four stations. The number of rows and stations depends on a number of factors such as permissible floorspace, workpiece loading time, welding sequence time, buffer inventory requirement, and interaction between workpieces in adjacent stations.

The high-speed robot 14 is programmed to properly grasp the workpiece W from a station at the unload end of the drag conveyor 12 and transition it to an attitude and position necessary to engage with the welding machine 16. Since the tooling uses a simple transfer pin 110, there is no requirement beyond programming, for tooling or tool set-up to accommodate different workpieces.

Figure 4B:
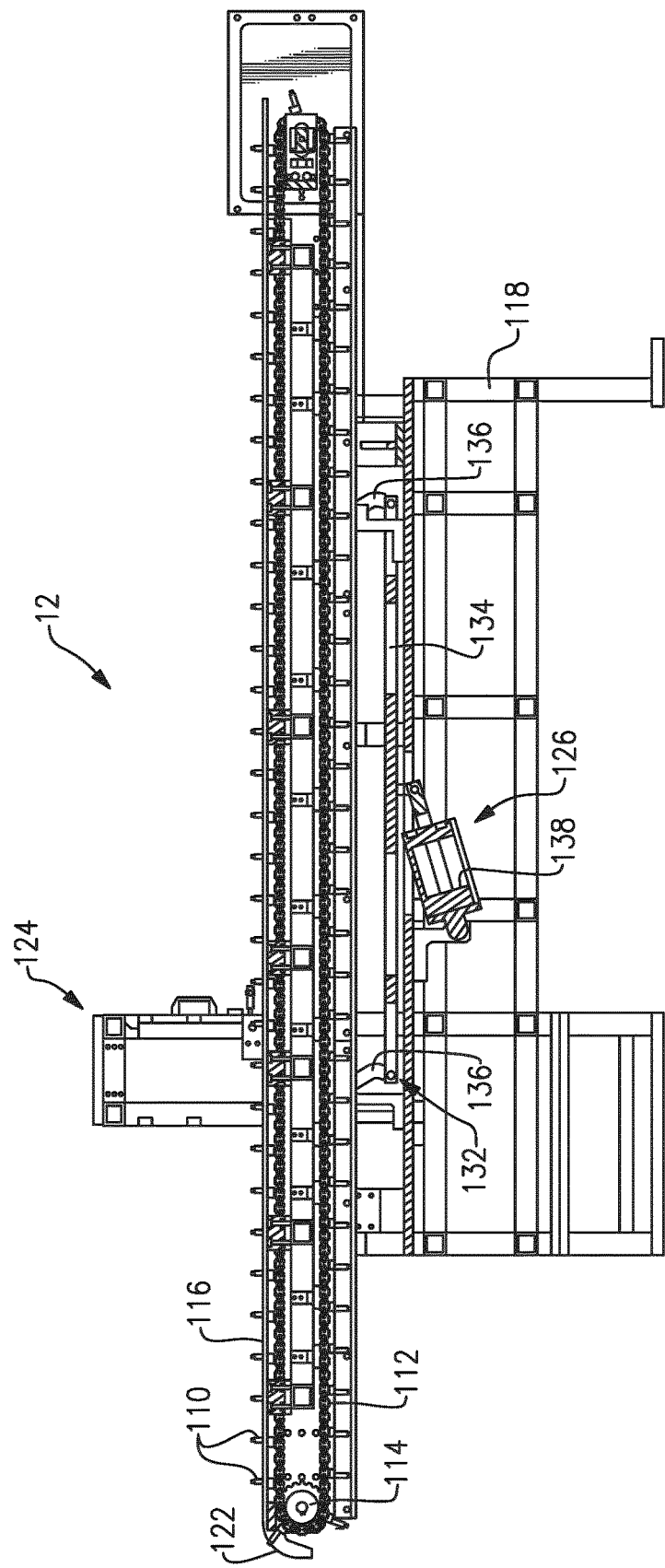
FIG. 4B is a side view of the part conveyor shown in FIG. 4A with a side cover removed for clarity.

Various features of the drag conveyor 12 are shown in more detail in FIGS. 4A-6. The drag conveyor 12 includes side covers 120 and front cover 122, as shown in FIG. 4A, that enclose the drive elements, such as the chains 112 and sprocket 114. The covers 120, 122 are removed for clarity in FIGS. 4B-5.

Referring to FIGS. 4A-4B, a barrier system 124 may be provided to prevent the machine operator from getting too close to the robot 14 during operation. Barrier system 124 may incorporate a means for sensing a condition, which requires an immediate halt to the progression of the transfer pins 110. An example is a sensor monitoring the position of a hinged barrier panel, to ensure the barrier panel is not dislocated from its normal position by the operator or something improperly placed on the drag conveyor 12. A photoelectric light curtain may be an alternative to the hinged breakaway barrier panel for assembly processes that do not have requirements for containment of metal expulsion and ultraviolet radiation.

Figure 4C:
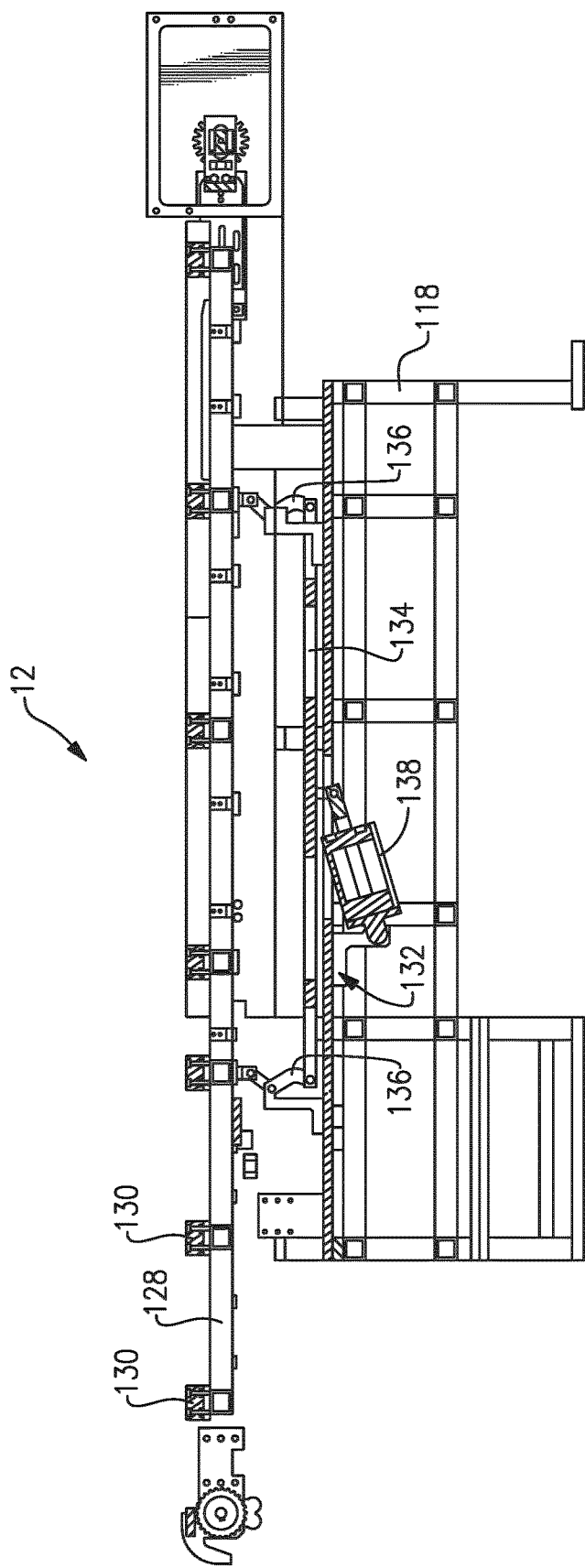
FIG. 4C is a side view of the part conveyor shown in FIG. 4B with conveyor chains removed for clarity.
Figure 4D:
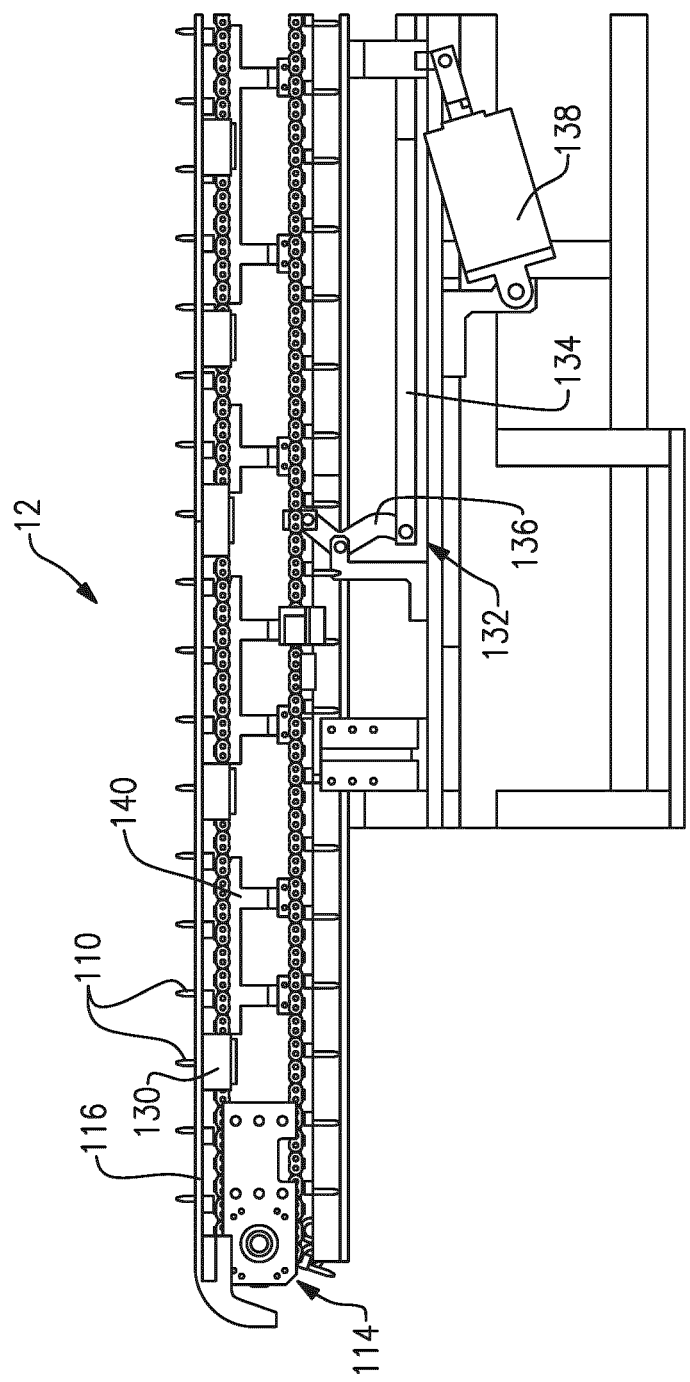
FIG. 4D is an enlarged partial side view of the part conveyor shown in FIG. 4C with the conveyor chain, friction bar and transfer pins.

Referring to FIGS. 4C-4D, an adjustment assembly 126 is supported on the conveyor frame 118 and is used to provide a desired amount of pin exposure for each workpiece W. The adjustment assembly 126 raises and lowers the friction bars 116, which are secured to mounting blocks 130 on a table 128, to effectively lengthen or shorten the transfer pins 110 by changing the amount the transfer pins 110 are exposed relative to the friction bars 116. A linkage 132 includes arms 136 that are pivotally supported by the conveyor frame 118. The arms 136 are interconnected to a bar 134 at one end, and the table 128 is pivotally connect to the arms 136 at an opposite end. Actuator cylinder 138 is connected to the bar 134 and is controlled to rotate the arms 136, thereby moving the table 128 and supported friction bars 116 up or down.

Support bars 140 are arranged beneath the upper portion of the chain 112, in particular, near the sprocket assembly 114. The support bars 140 prevent the chain 112 from sagging or vibrating, which more precisely locates the workpiece W in preparation for the robot 14 picking up the part.

Figure 5:
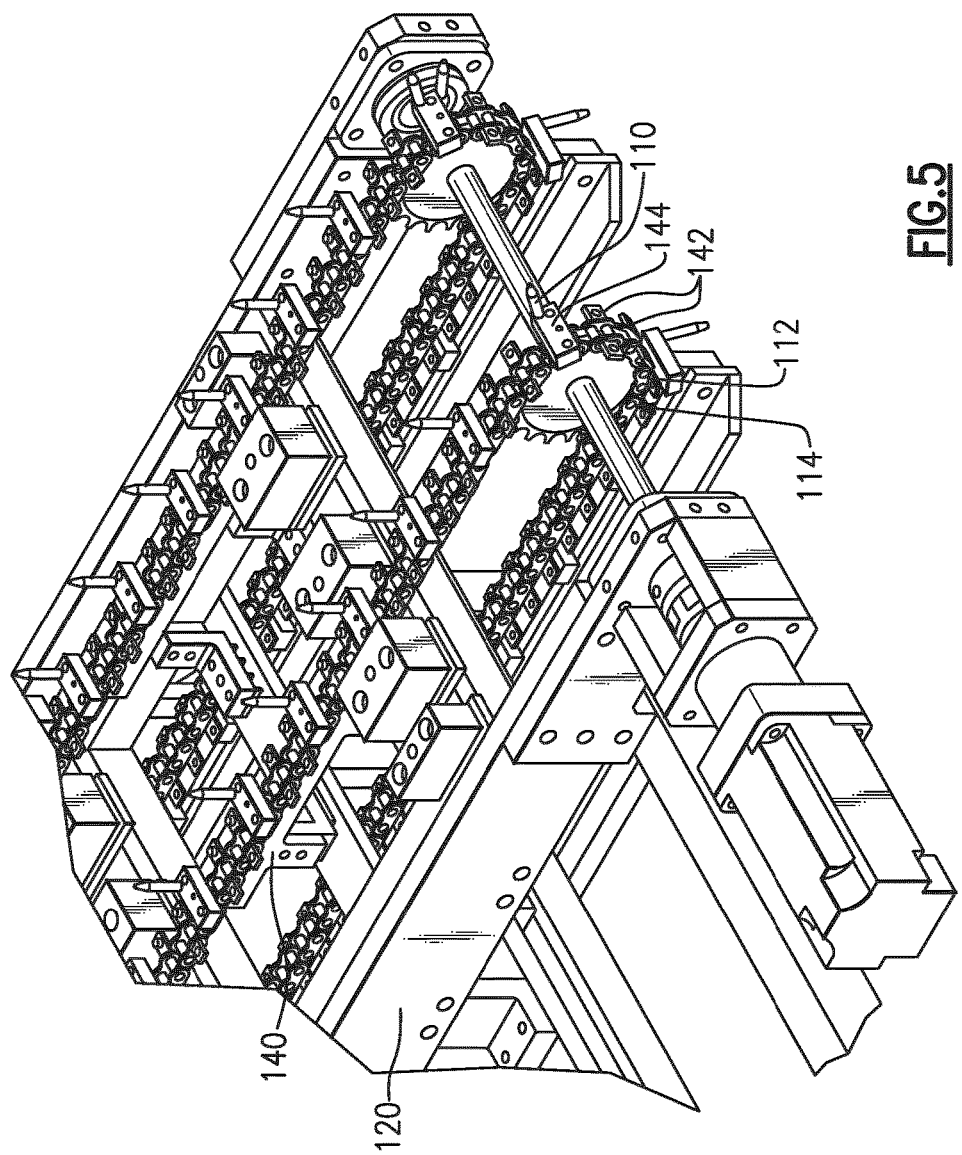
FIG. 5 is a perspective view of a portion of the part conveyor shown in FIG. 4D illustrating the transfer pins.

Referring to FIG. 5, the conveyor chains 112 include links having tabs 142 to which pin blocks 144 are secured. The transfer pins 110 are mounted to the pin blocks 144, for example, by a threaded interface. Different sized and shaped transfer pins 110 can be mounted to the pin blocks 144 when the welding system 10 is reconfigured to weld different workpieces.

Figure 6A:
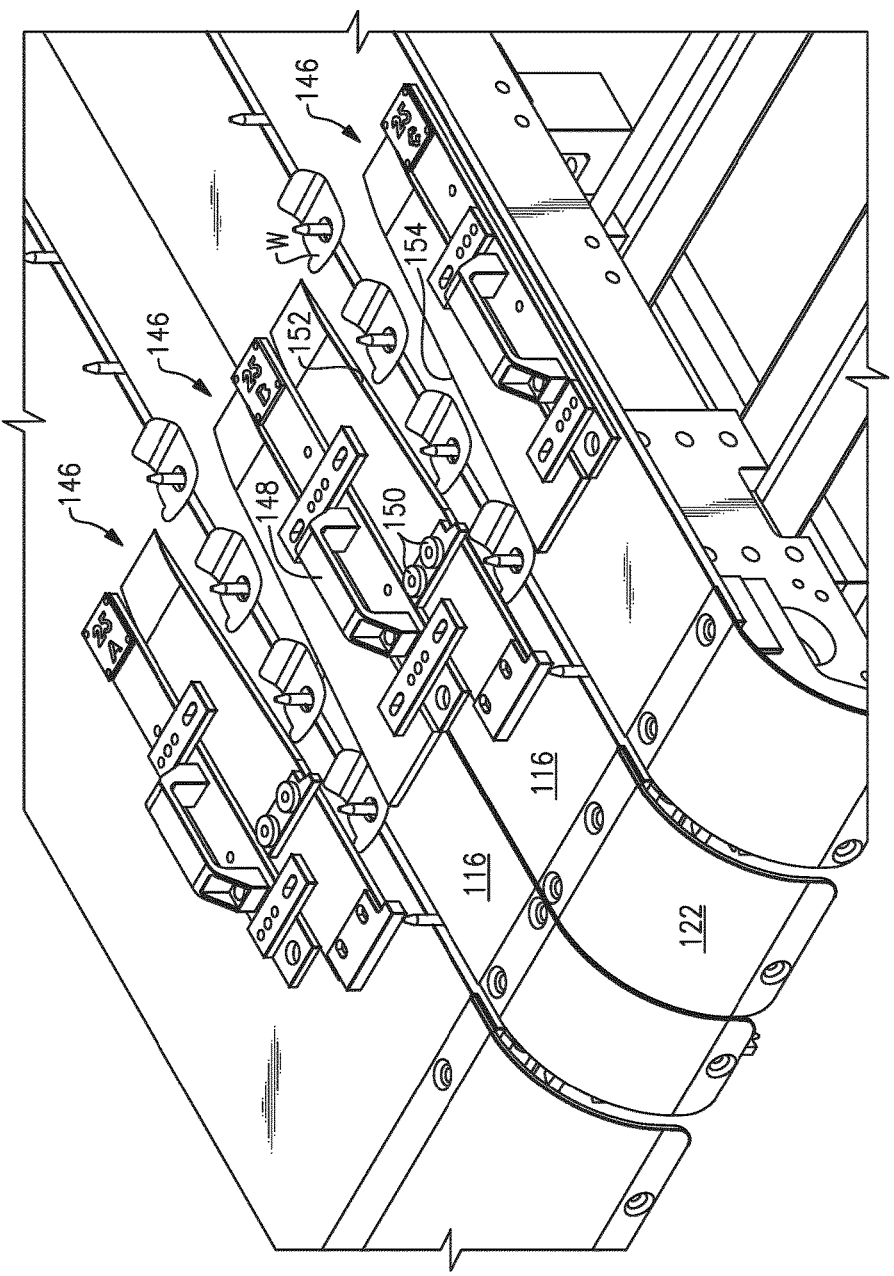
FIG. 6A is a perspective view of a front portion of the part conveyor shown in FIG. 4A with a first set of guides installed.
Figure 6B:
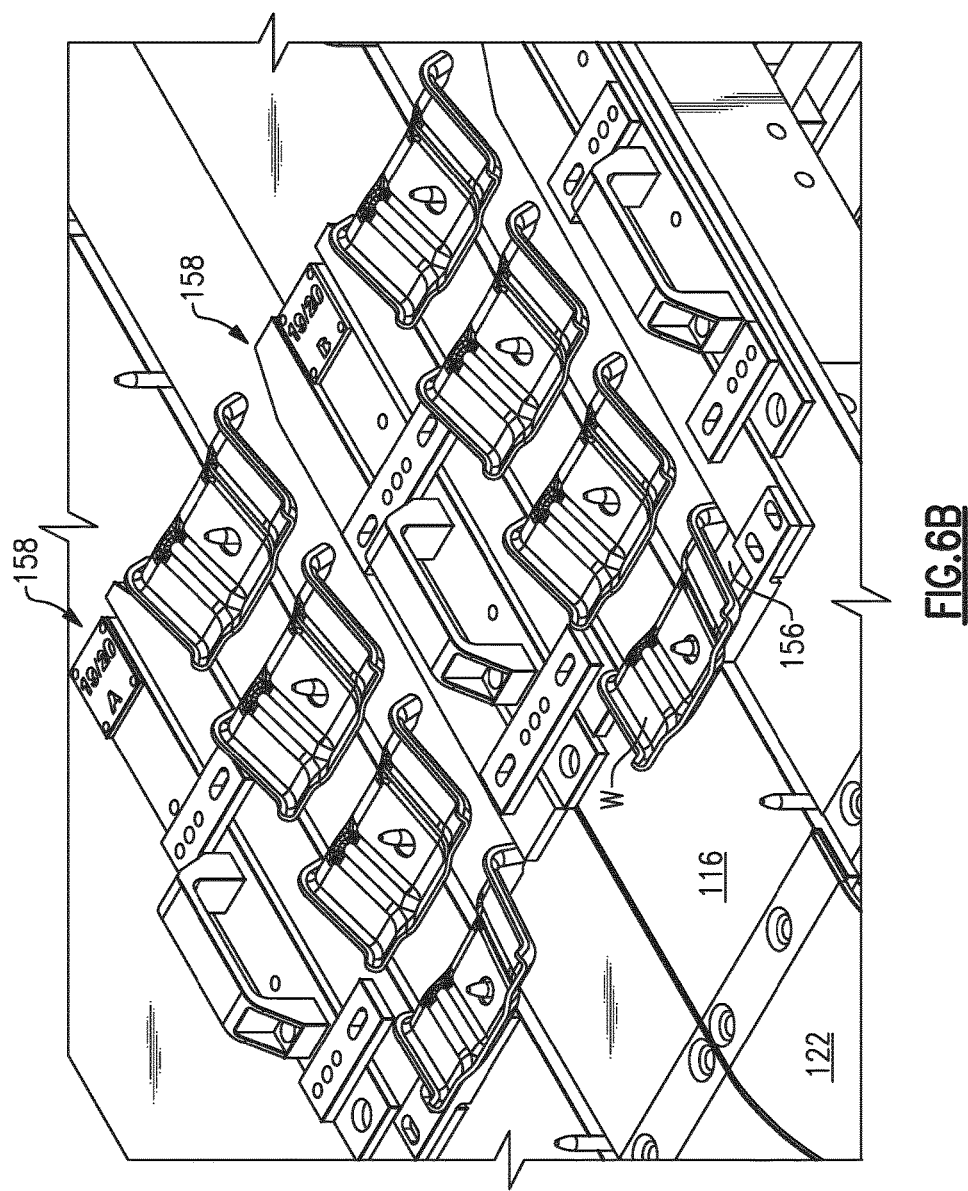
FIG. 6B is a perspective view of a front portion of the part conveyor shown in FIG. 4A with a second set of guides installed.

Typically the friction between the friction bars 116 and the workpiece W is sufficient to locate the workpiece accurately enough for the robot 14. Guides 146 may be used if more precise alignment of the workpiece W is desired, as shown in FIGS. 6A-6B. The guides 146 may be provided as a set for a given workpiece W. The guides 146 include handles 148 for manipulation by the operator so the guides 146 may be easily positioned on the friction bars 116 and secured thereto by fasteners 150. Adjacent edges 152, 154 of adjacent guides 146 interacted with the sides of the workpiece W to ensure a desired orientation of the workpiece W as it nears the end of the drag conveyor 12 for pick up by the robot 14. The example guides 158 shown in FIG. 6B include ramps 156 that lift the front end of the workpiece W so the workpiece is more easily grasped by the robot 14 using its grippers. The robot 14 may use a magnet instead of a gripper, if desired.

Figure 7:
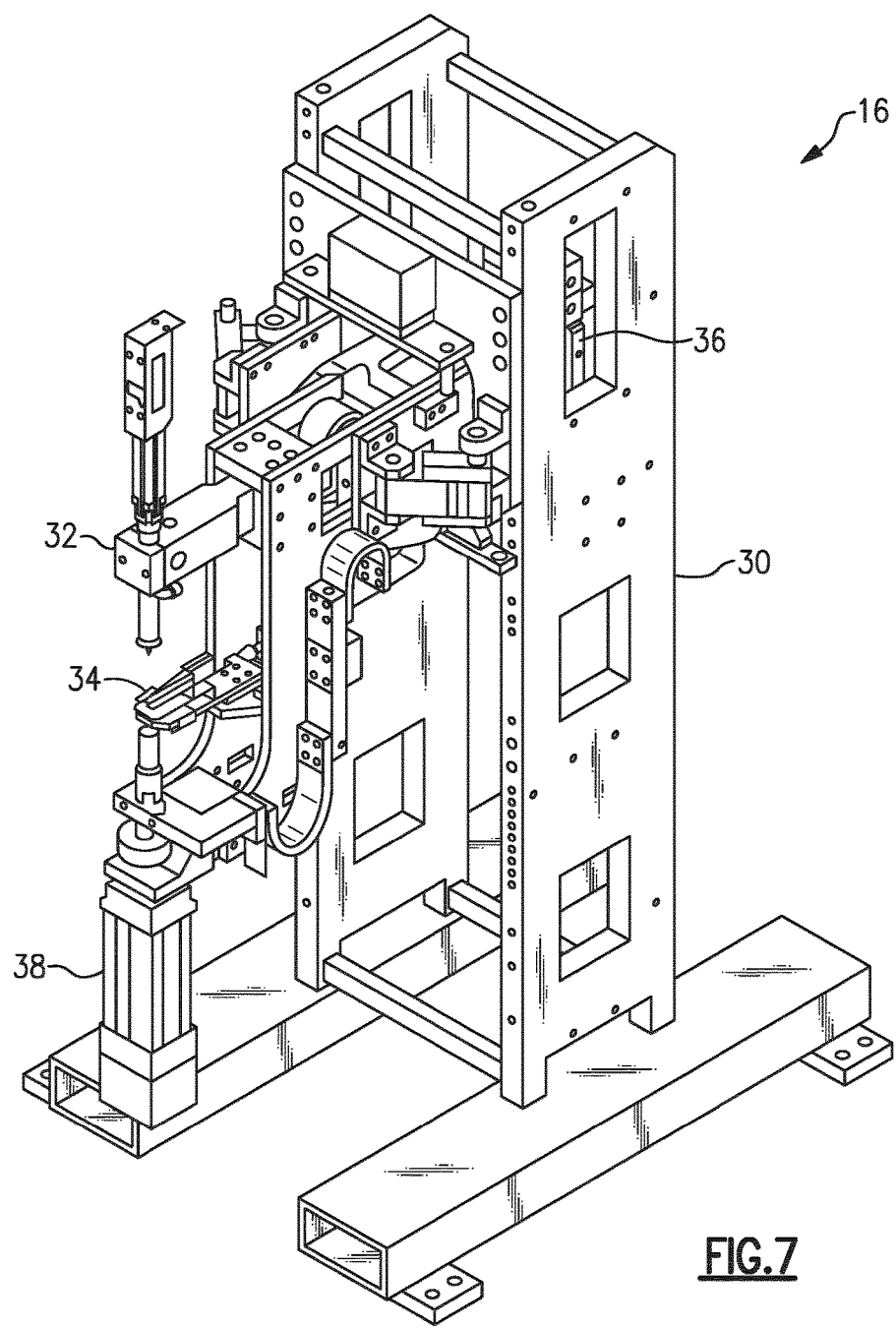
FIG. 7 is a simplified perspective view of a welding machine.
Figure 8:
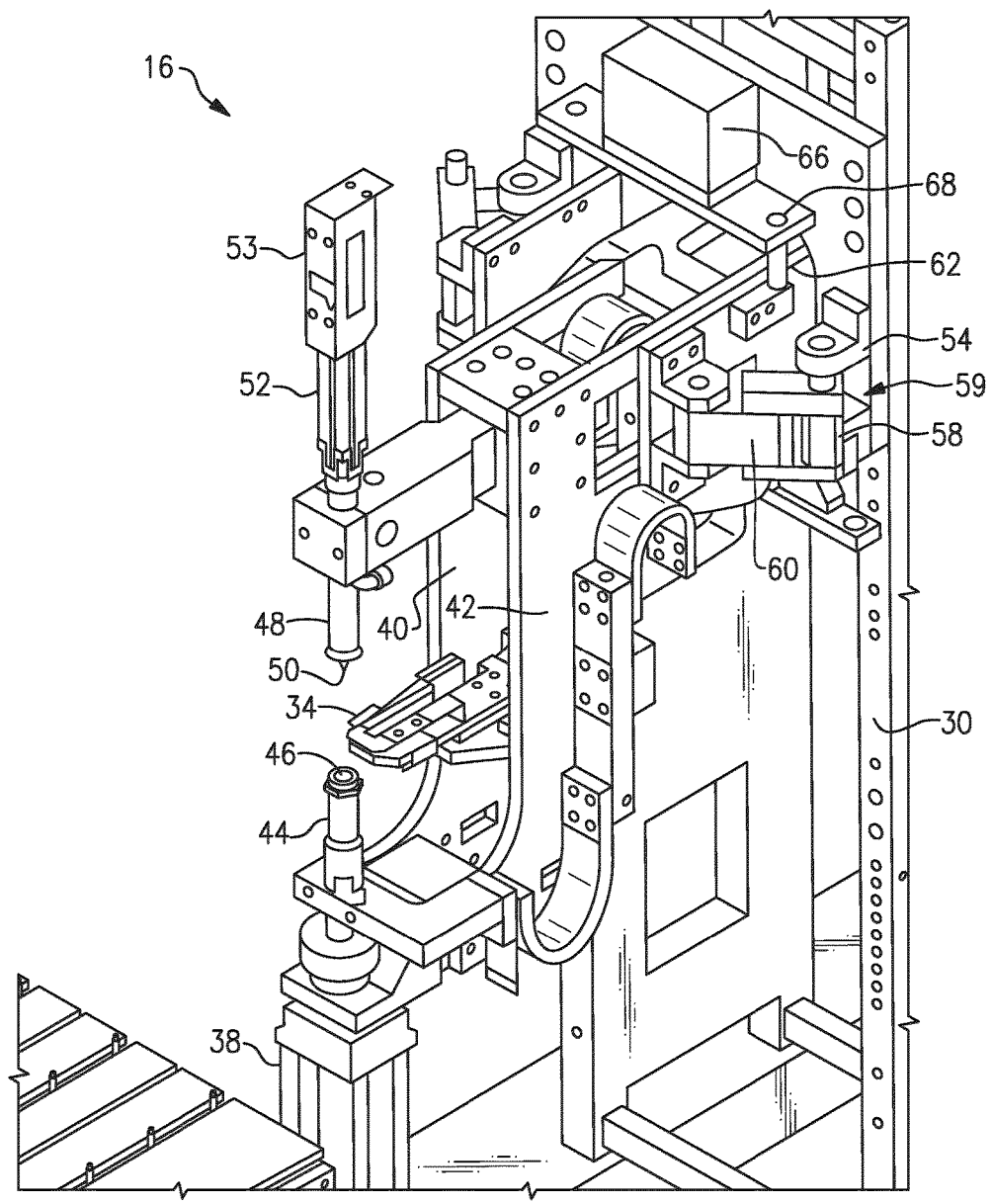
FIG. 8 is an enlarged perspective view of the resistance welding gun incorporated in the welding machine.
Figure 9A:
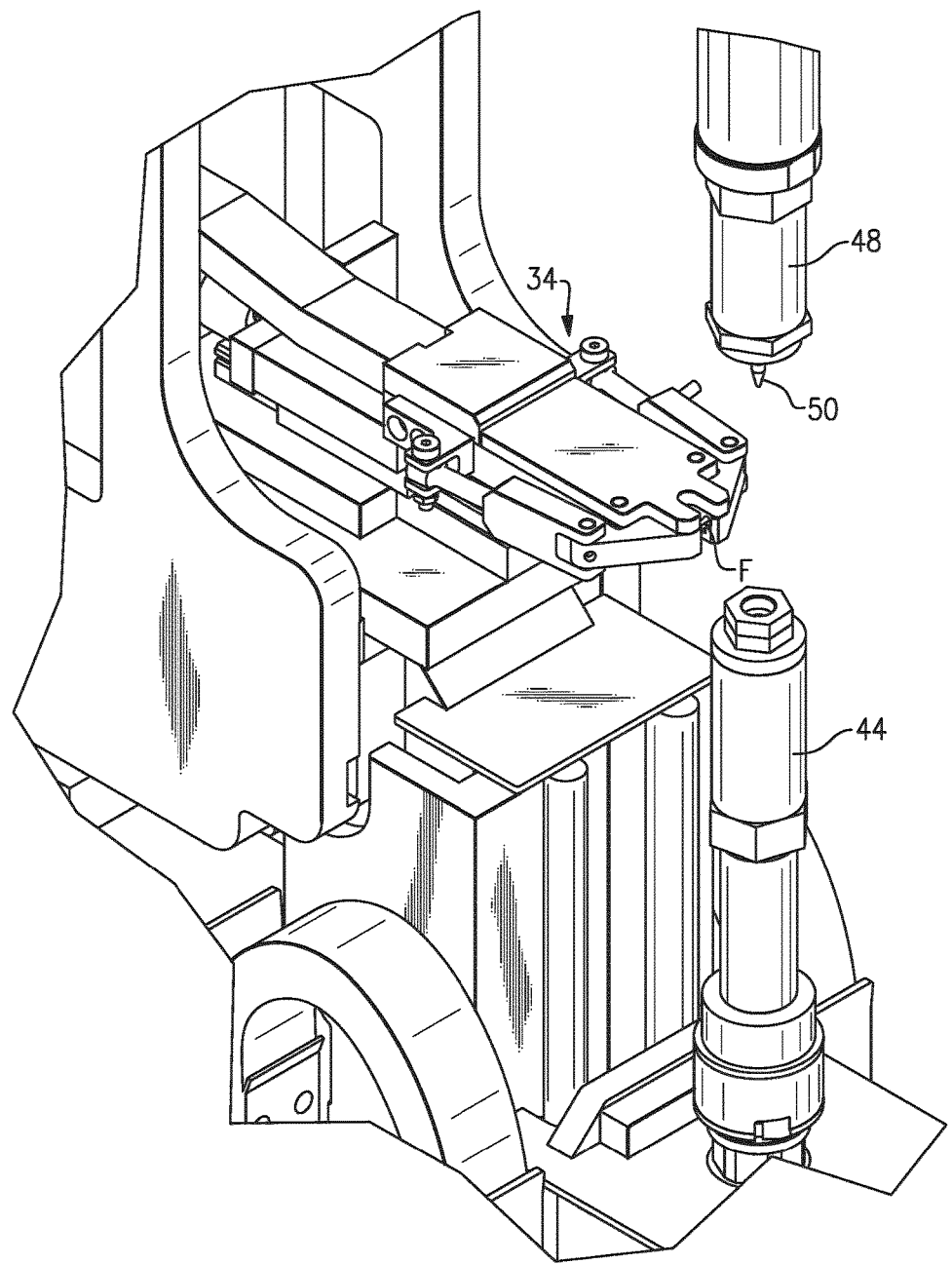
FIG. 9A is another enlarged perspective view depicting the welding gun with a fastener feeder in a feeder retracted position, a pin in a pin retracted position, and an electrode in an electrode advanced position.
Figure 9B:
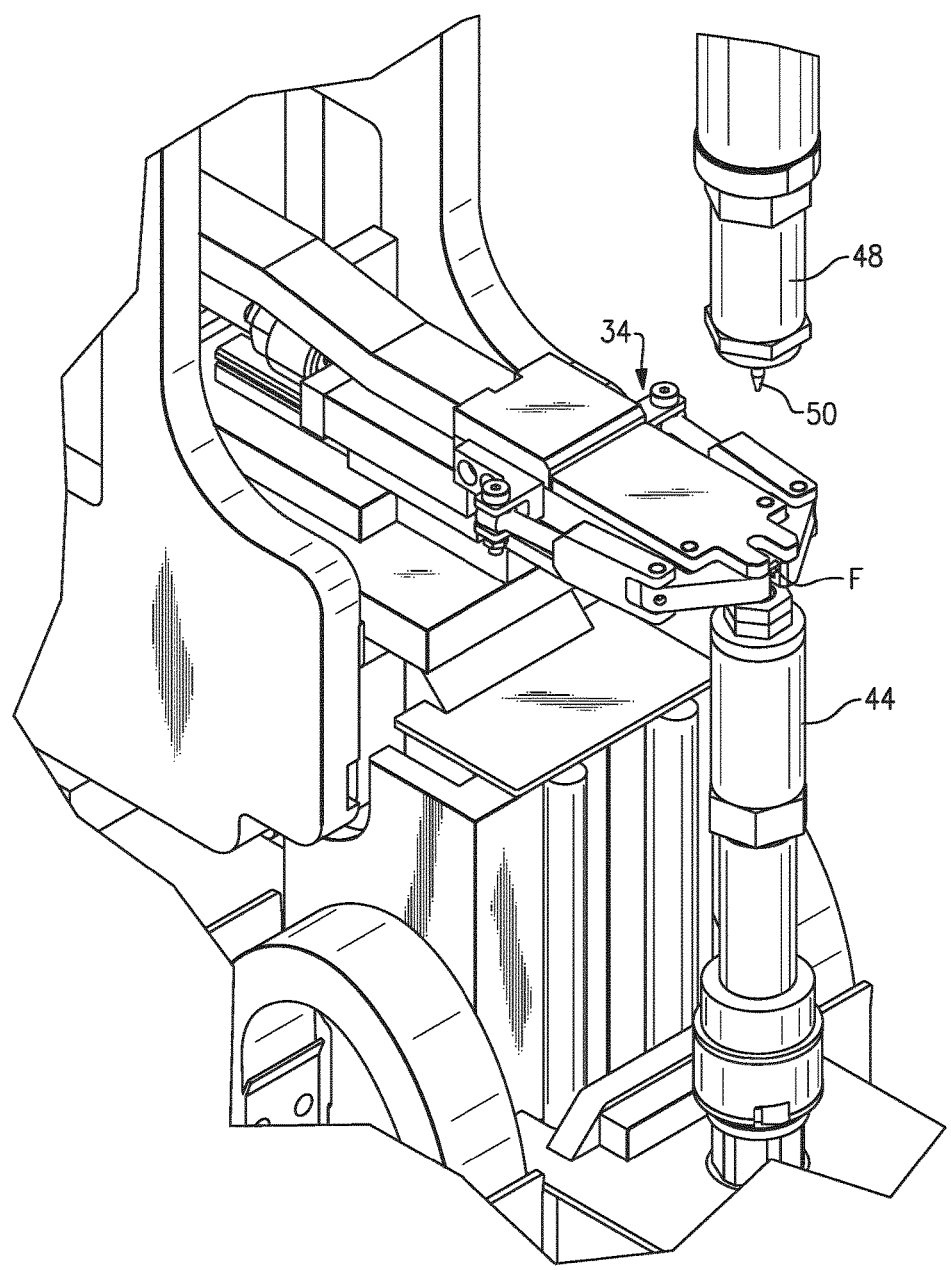
FIG. 9B is an enlarged perspective view depicting the feeder in a feeder advanced position and the electrode in the electrode advanced position.
Figure 9C:
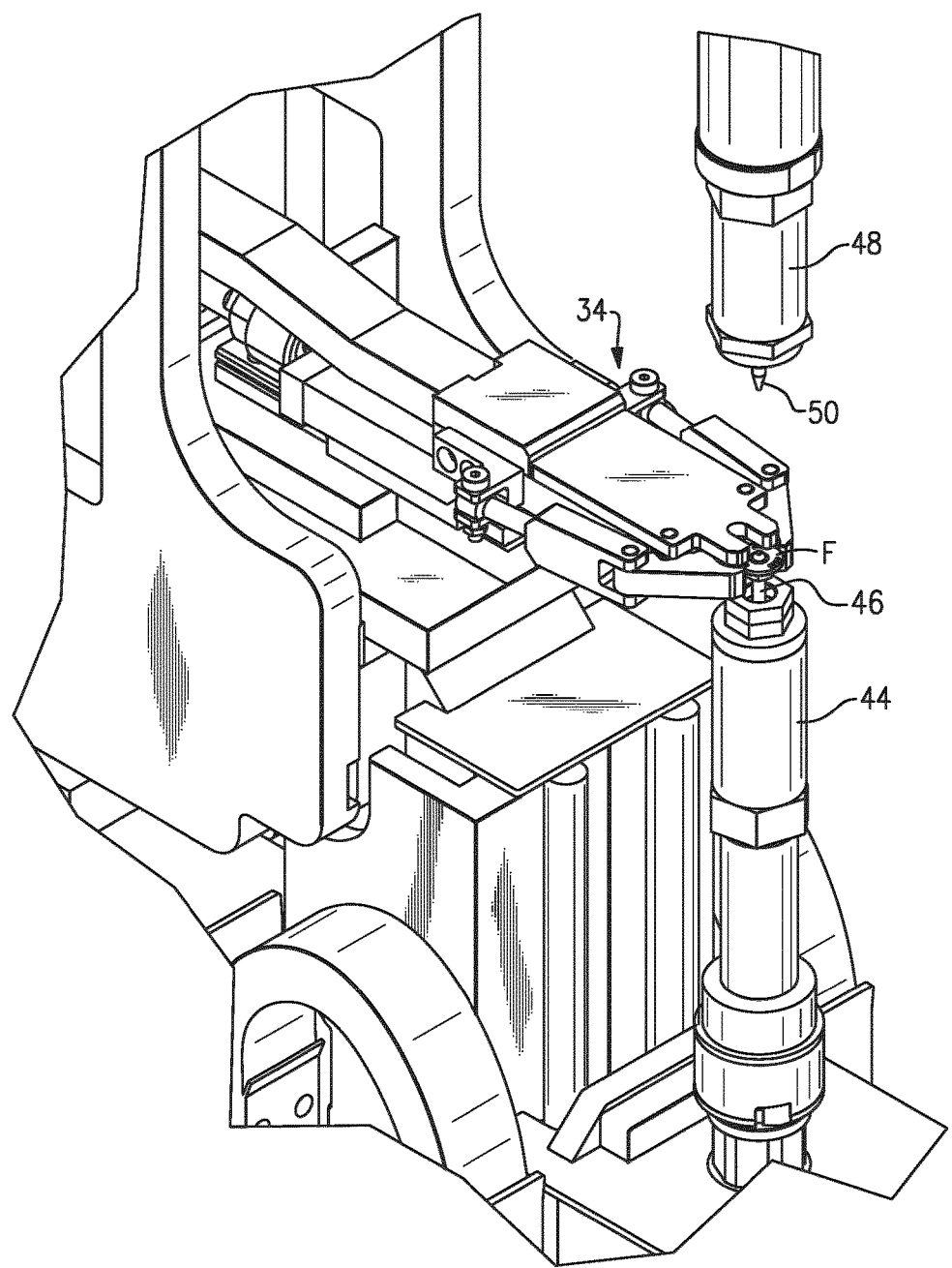
FIG. 9C is an enlarged perspective view depicting the pin in a pin advanced position and the fastener feeder moving from the feeder advanced position to the feeder retracted position.
Figure 9D:
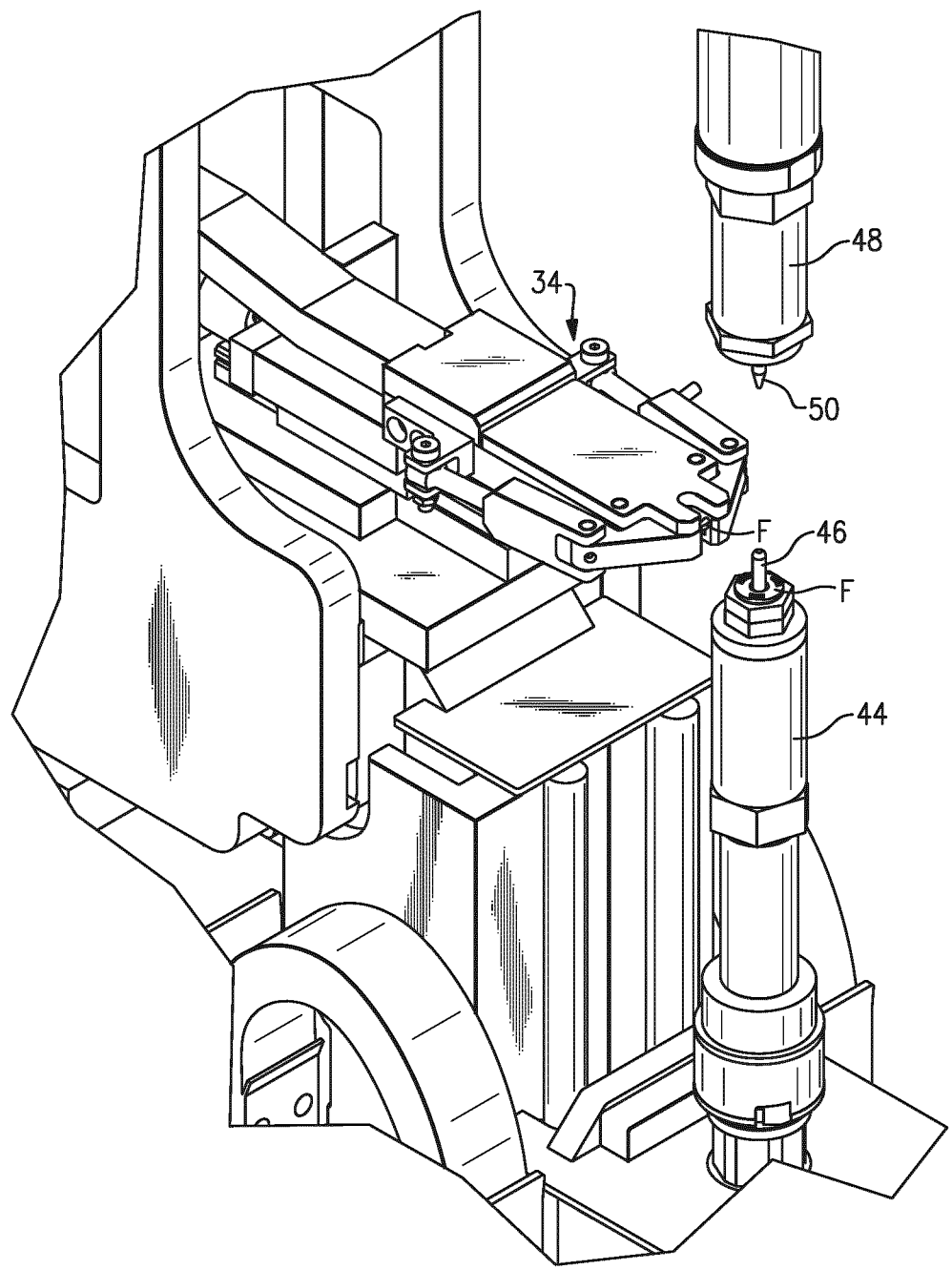
FIG. 9D is an enlarged perspective view depicting the pin in the pin advanced position and the fastener feeder in the feeder retracted position.

The high-speed robot 14 and the welding machine 16 are coordinated by a control system 20 to engage the workpiece W with the welding machine 16 as quickly as possible so the welding process can be completed and the completed assembly discharged from the welding system 10. Referring to FIGS. 7 and 8, the welding machine 16 includes provisions, such as the float assembly for accommodating some misalignment of the workpiece due to variation of the attitude of the workpiece on the drag conveyor 12 and positioning error of the high-speed robot 14 plus any positioning error due to variations in the workpiece W, or movement of the workpiece W in the gripping device of the high-speed robot 14 during the workpiece transfer.

In further detail, with continuing reference to FIG. 2, the size and configuration of the welding system are suited to the range of assemblies to be welded. The welding machine 16 capability, including its physical size, welding current or power capability, and electrode force range are determined by the workpiece characteristics and the requirements of the welding process. The configuration and height of the unload chute 18 is based on the type of container in which the completed weldment is discharging.

The welding machine 16 shown in FIGS. 7 and 8 is a resistance welding machine configured for welding projection weld nuts. It could also be configured to weld projection weld studs, to weld by other means such as laser welding, or to perform other processes such as assembly. The versatility of the welding system 10 can be expanded by incorporating multiple welding machines 16 that weld different sized fasteners F or different types of operations. These either can be located within easy reach of the high-speed robot, manually repositioned, or supplied with automation to index one or more welding machines 16 to the active position within the reach of the high-speed robot 14.

The welding machine 16 as shown in FIG. 7 includes a welding machine frame 30 supporting a resistance welding gun 32 and a feeder 34 for delivering a fastener F to be welded to a workpiece W. The welding machine frame 30 maintains the alignment and orientation of the components and includes provisions for leveling to ensure the desired function. The resistance welding gun 32 supports a resistance welding transformer 36 to produce the required welding current and a welding actuator 38 for achieving the required coordinated motion of the welding electrodes and the necessary electrode force for welding. The resistance welding transformer can be of any type, such as alternating current or inverter. The resistance welding gun is oriented to exploit gravity to maintain engagement with the fastener F delivered by a feeder 34 as it is moved to the welding position. The feeder 34 dispenses one fastener F to be welded to the workpiece at a time onto the movable welding electrode 44.

The feeder 34 shown is for feeding projection weld nuts. The design of the feeder 34 will be based on the requirements of the fastener F to be welded and may for example be a stud, pin, or bracket; or other process such as feeding of a rivet, screw, clinch nut, mechanical clip, or other mechanical fastener. Thus, the welding machine 16 can employ a process other than resistance welding or a process that does not involve such mechanical fastening involving riveting, self-piercing fastener, bolting, or the like.

The welding machine frame 30 is rigid enough to ensure consistency of the resistance welding gun 32 position when the mass of the gun is shifting and when it is subjected to external forces. When a welding cycle is requested, the welding actuator 32 extends to a position that is aligned with the feeder 34 when it advances to deliver a component to be welded. When the feeder 34 retracts to its home or feeder retracted position, the welding actuator 32 extends fully to close the electrodes and press the fastener F to be welded against the workpiece W positioned by the high-speed welding robot 14. During the welding sequence, welding current delivered by the resistance welding transformer 36 creates the heat for welding. At the completion of the weld, the output of the welding actuator 38 is retracted to return the moveable welding electrode 44 to its home or electrode retracted position.

The welding machine frame 30 of FIG. 7 holds the resistance welding gun 32 at the required working height determined in large part by the required height of the unload chute 18 or by clearance necessary to ensure there is no interference with the operation of the resistance welding gun 32. The resistance welding gun 32 is sized to accommodate the physical size of the workpiece W or workpieces, and the required electrode force and welding current. The stroke of the welding actuator 38 is determined by the required resistance welding gun 32 opening and that in turn determines the length of the welding actuator 38.

The configuration of the welding machine frame 30 illustrated in FIG. 7 is a generic design for illustration purposes. The welding machine frame 30 can be a standardized version or a custom design created for a specific application. The welding machine frame 30 can stand alone, it can be mounted to a frame that supports the other components of the welding system 10, or it can be incorporated into a larger piece of equipment providing multiple functions. The C-type resistance welding gun 32 shown employs a welding actuator 38 that moves the electrode in a linear motion towards an opposing stationary welding electrode 48 (FIG. 8). Linear motion is desirable for projection welding because it is most effective for providing consistent force on each projection and to follow the projection collapse during the weld.

The resistance welding gun 32 can be of any design, construction or material that achieves the requirements for the particular project scope. The welding actuator illustrated is an electric servo type but it could also be a pneumatic cylinder with an intermediate stroke position, such as a retract cylinder or other similar device.

FIG. 8 shows elements of the welding machine 16 in more detail. The resistance welding gun 32 includes two spaced apart welding gun side frames 40 and 42 that provide the main structure to hold the components of the gun, contain the welding force, and provide a means for mounting within the welding machine 16. A moveable welding electrode 44, containing a fastener rough locating pin 46, is connected to the output shaft of the welding actuator 38. A stationary welding electrode 48 containing a fastener locating pin 50, opposes the moveable welding electrode 44. The fastener locating pin 50 is actuated by a locating pin cylinder 52 and its position is sensed by a locating pin position sensor 53.

Examples relating to suitable pin position sensing can be found in U.S. Pat. No. 6,576,859, entitled "Resistance Welding Fastener Electrode," issued Jun. 10, 2003 and PCT International Application No. PCT/CA2014/050896, entitled "Welder with Indirect Sensing of Weld Fastener Position", filed Sep. 18, 2014, which are incorporated by reference herein in their entirety.

The sensor(s) can be used to track the electrode and welding pin movement to monitor situations that might generate an error leading to a defective part or a fault in the welding system 10. For example, if the pin locating the fastener is depressed when the welding gun closes on the workpiece presented by the robot, the workpiece may not have a clearance hole, or the workpiece may have slipped in the robot gripper too far for the floating action of the welding unit to accommodate (discussed in more detail below). The control system 20 in this case can instruct the robot 14 to deliver the workpiece to a containment area and pick up a new workpiece from the drag conveyor 12. In another example, if the electrode is not closed to the expected height, there may be an improper workpiece, fastener, or perhaps two fasteners. In this scenario, the system may first try to eject the fastener and reload. If the same error occurs, the workpiece is replaced as above.

The stationary welding electrode 48 and fastener locating pin 50 are specifically designed to suit the thickness of the workpiece W plus the clearance hole and fastener F locating diameter. The fastener locating pin 50 needs to be designed with gentle and smoothly transitioned curves to help urge the resistance welding gun 32 into the correct position. Excessive roughness, sharp angles, or steps on the fastener locating pin 50 may cause the pin to hang up on the workpiece, thereby inhibiting the locating pin cylinder 52 from advancing the fastener locating pin 50 to its fully extended position. Significant deviation of the workpiece W hole location can be accommodated by this arrangement. The maximum deviation would be in the range of 40% of the fastener thread being gaged. Our demonstration system is somewhat higher—providing a 5 mm window of compensation for a fastener having an 8 mm thread.

The stroke and force capability of the locating pin cylinder 52 needs to be sufficient to overcome the force applied to the fastener rough locating pin 46 in the movable welding electrode 44.

The resistance welding gun 32 is connected to the machine frame 30 by one or more float assemblies 59 which permit motion within a plane. For simplicity, the description of one mechanism will be described although FIG. 4 shows there is one such mechanism located on opposing sides of the resistance welding gun 32. The planar alignment of bracket 54 on frame with the bracket 56 on welding unit is provided by link 58 to frame and link 60 to welding unit. Pins and bearings are provided at the attachment points between the components of this mechanism to enable welding gun 32 to float freely relative to the frame 30. A homing assembly 61 includes a homing actuator 66 that engages guide pins 62 and 64 to urge the resistance welding gun to a fixed home position that is the nominal position of the fastener locating pin 50 where the high-speed robot 14 has been programmed to position the clearance hole for the fastener locating pin 50.

The resistance welding gun 32 of FIG. 8 provides clearance between the welding gun side frames 40 and 42 to accommodate the feeder 34. Like the welding gun side frames 40 and 42, the feeder 34 represents a potential point of interference between the resistance welding gun 32 and the workpiece or high-speed welding robot gripper so it is desirable to keep it out of the way and this is accomplished by putting it in the throat of the resistance welding gun 32. The feeder 34 is commonly provided with components, such as fasteners, from an automatic feeding system by way of a tube, track, or carrier (e.g., vibratory feeder bowls 17a, 17b shown in FIG. 1). The feed path required to accommodate this apparatus can be quite long and it can be provided for and accommodated within the welding machine frame 30.

To load the component such as a fastener, the rod of the welding actuator 38 is advanced (with the feeder 34 in the feeder retracted position) to raise the movable welding electrode 44 to the electrode advanced position (FIG. 9A) necessary to interact with the feeder 34. The feeder 34 advances in a linear motion to a feeder advanced position (FIG. 9B) where the fastener is aligned with the fastener rough locating pin 46. At this time, the fastener rough locating pin 46 is advanced to its fully extended pin advanced position (FIG. 9C) to capture the fastener. Then the feeder 34 is withdrawn to its home feeder retracted position (FIG. 9D), the action of which causes the feeder 34 to release the fastener on the fastener rough locating pin 46. With the feeder 34 clear of the moveable welding electrode 44, the welding actuator 38 is free to advance the moveable welding electrode 44, as soon as the high-speed welding robot 14 confirms it has placed a workpiece over the fastener locating pin 50 in the stationary welding electrode 48.

An example operating sequence of each of the principle welding system 10 components is as follows. The equipment operator or automation will load workpieces on the drag conveyor 12 whenever there is an available station within reach. The drag conveyor 12 will advance workpieces W towards the unloading zone C whenever there are no workpieces W properly oriented for pick-up within the unloading zone C. The high-speed robot 14 will move to position to engage a workpiece W when it is free to begin the transfer sequence and a workpiece W has been detected in an orientation conducive to engagement. When the resistance welding gun 32 is opened sufficiently to accept the high-speed robot 14 to load a workpiece W, the high-speed robot 14 will move the workpiece W to a position in alignment with the stationary welding electrode 48. Independently, or simultaneously with the operation of the high-speed robot 14, when the moveable welding electrode 44 has been moved by the welding actuator 38 to the position to receive the fastener F from the feeder 34, the feeder 34 will advance to the location in which the fastener F is aligned with movable welding electrode 44. The fastener rough locating pin 50 is then advanced to engage with the fastener F. The feeder 34 is then retracted to its rest position. When the feeder 34 has retracted, the fastener F will be raised towards the workpiece W by the movable welding electrode 44 on which it is resting. When the welding actuator 38 reaches the travel distance at which the workpiece W and fastener F should be in contact between the moveable welding electrode 44 and stationary welding electrode 48, homing guide pins 62 and 64 will be released from the homing guides 68 and 70. The fastener locating pin 50 will then advance to monitor and verify the part position as well as to bring the parts to be welded, if present, into alignment by urging the resistance welding gun 32 to move. The welding machine 16 will perform the welding operation. When the workpiece W does not require an additional fastener F and can be supported by the welding electrodes, the high-speed robot 14 will disengage from the workpiece W and move to retrieve another workpiece W from the drag conveyor 14. Otherwise, it will continue to hold and support the workpiece W until the moveable electrode 44 has retracted sufficiently to either permit the high-speed robot 14 to index the subassembly to the next welding position, or to release the completed assembly so it can exit the welding system 10. The welding actuator 38 will return the moveable welding electrode 44 to its fully lowered position to begin the fastener feeding and welding cycle over again.

If there is a requirement to weld additional fasteners the feeder 34 operating sequence and welding sequence can be repeated as soon as the moveable welding electrode 44 has returned to the feeder 34 cycling position. If the welding is complete, the high-speed robot 14 can move the assembly to the position where it can be released.

The disclosed welding system welds fasteners at high speeds to maximize labor productivity while reducing complexity to minimize downtime and capital cost. Both the equipment and operator productivity are improved by freeing the operator from having to load components synchronously with the welding machine cycle. When the operator can grab a number of workpieces from the storage bin and load them into the equipment at a higher rate than the equipment cycle time, the time required for the operator to get more workpieces from the bin can be buried in the system cycle time so the welding process can proceed at the maximum production rate of the welding machine.

Maximizing the production rate allows the capital cost of the welding machine or assembly processes to be amortized over more assemblies. In addition to the labor savings that comes from increasing the rate of production welding, increased production volume provides an opportunity to amortize the cost of any supplemental error avoidance systems over more assemblies.

The system provides sufficient speed, versatility, and reliability to be located in the stamping bay where the stampings are produced or where injection molding occurs to eliminate storage of inventory and extra material handling.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

The invention claimed is:
1. An assembly system comprising:
   an assembly station that is configured to assemble a component to a part in a loaded position;
   a drag conveyor includes:
      a movable conveyor member that supports multiple locating elements configured to cooperate with a locating feature on a part;
      a friction bar arranged along the locating elements, the locating elements extend beyond the friction bar, the friction bar is configured to support the part and reorient the part from an unoriented position to an oriented position while the movable conveyor member drags the part along the friction bar; and
   a robot configured to transfer a part from the oriented position on the conveyor to the loaded position at the assembly station.

2. The system according to claim 1, wherein the conveyor member is a continuous chain that supports the multiple locating elements.

3. The system according to claim 2, wherein the conveyor includes multiple rows of conveyor members with locating elements.

4. The system according to claim 2, wherein the locating elements are transfer pins.

5. The system according to claim 2, wherein the conveyor includes a sprocket coupled to the chain, and a support bar is arranged beneath the chain adjacent to the sprocket, the support bar configured to position the locating element as the locating element approaches an end of the conveyor.

6. The system according to claim 1, wherein the conveyor has an adjustment assembly connected to the friction bar and configured to move the friction bar relative to the locating elements.

7. The system according to claim 6, wherein the adjustment assembly includes a linkage interconnecting a cylinder to a frame that supports the friction bar, the frame configured to move vertically in response to the cylinder pivoting the linkage.

8. The system according to claim 1, wherein the conveyor includes a guide arranged on the friction bar adjacent to the locating element, the guide configured to reorient the part from the unoriented position to the oriented position.

9. The system according to claim 8, wherein the guide has a ramp configured to cooperate with a front of the part to lift the front off of the friction bar.

10. The system according to claim 1, comprising multiple conveyors, each conveyor configured to carry a different part.

11. A method of positioning a part with a conveyor, the method comprising the step of:
    manually loading a part onto a conveyor locating element in an unoriented position, wherein the conveyor locating element is carried by a conveyor member;
    dragging the part with the conveyor member along a conveyor friction bar to an oriented position; and
    picking up the part robotically from the oriented position.

12. The method according to claim 11, wherein the multiple locating elements are arranged at a regular spacing, and the manually loading step includes manually loading parts onto the locating elements at an irregular spacing.

13. The method according to claim 11, wherein the locating element is a transfer pin, and the manually loading step includes placing the transfer pin through a hole in the part.

14. The method according to claim 13, wherein the dragging step includes pivoting the part about the transfer pin from the unoriented position to the oriented position.

15. The method according to claim 11, wherein the dragging step includes stabilizing the locating element near an end of the conveyor prior to performing the part picking up step.

16. The method according to claim 11, comprising the step of laterally adjusting a position of the part from a first oriented position to a second oriented position near an end of the conveyor prior to performing the part picking up step.

17. A method of positioning a part with a conveyor, the method comprising the step of:
    manually loading a part onto a conveyor locating element in an unoriented position;
    dragging the part with a conveyor member along a conveyor friction bar to an oriented position;
    picking up the part robotically from the oriented position; and
    wherein the manually loading step includes supporting the part on the conveyor friction bar, and comprising the step of adjusting a height of the friction bar relative to the conveyor locating element prior to the manually loading step.

18. The method according to claim 17, wherein the manually loading step includes manually loading parts onto multiple rows of conveyor locating elements.

19. An assembly system conveyor comprising:
    a continuous conveyor member that includes multiple transfer pins, at least one of the transfer pins configured to cooperate with a hole in a part;
    friction bars arranged along lateral sides of a row of the transfer pins, the transfer pins extend beyond the friction bars and are configured to move relative thereto, the friction bars are configured to support the part and reorient the part from an unoriented position to an oriented position while the friction bars are in a fixed position.

20. The assembly system conveyor according to claim 19, comprising a support bar arranged beneath the continuous conveyor member, the support bar configured to position the transfer pin as the transfer pin approaches an end of the conveyor.

21. The assembly system conveyor according to claim 19, wherein the conveyor includes a guide arranged on the friction bar adjacent to the locating element, the guide configured to reorient the part from the unoriented position to the oriented position.

22. An assembly system conveyor comprising:
    a continuous conveyor member that includes multiple transfer pins, at least one of the transfer pins configured to cooperate with a hole in a part;
    friction bars arranged along lateral sides of a row of the transfer pins, the transfer pins extend beyond the friction bars, the friction bars are configured to support the part and reorient the part from an unoriented position to an oriented position while the friction bars are in a fixed position; and
    an adjustment assembly connected to the friction bar and configured to move the friction bar vertically relative to the transfer pin.

* * * * *